United States Patent Office 3,565,811
Patented Feb. 23, 1971

3,565,811
STABILIZED 1,1,1-TRICHLOROETHANE COMPOSITION
Leighton S. McDonald, Angleton, Tex., assignor to The Dow Chemical Company, Midland, Mich., a corporation of Delaware
No Drawing. Filed Dec. 29, 1967, Ser. No. 694,420
Int. Cl. C09d 9/00; C11d 7/52; C23g 5/01
U.S. Cl. 252—171
4 Claims

ABSTRACT OF THE DISCLOSURE 1,1,1-trichloroethane stabilized with minor amounts of methoxyacetonitrile, a lower alkylene oxide and nitromethane or propargyl alcohol and mixtures thereof and to a process for preventing deterioration of 1,1,1-trichloroethane in contact with the metals aluminum, iron, copper, zinc and their alloys by intimately admixing with such 1,1,1-trichloroethane a stabilizing amount of methoxyacetonitrile, nitromethane or propargyl alcohol, and a lower alkylene oxide and mixtures thereof. The invention also relates to a process for degreasing metals employing the compositions above set forth.

---

The present invention relates to a new and useful composition of matter and more particularly relates to a stabilized 1,1,1-trichloroethane composition suitable for use in contact with metals which degrade the solvent such as aluminum, iron, zinc, copper and their alloys.

BACKGROUND OF THE INVENTION

It is now well established that 1,1,1-trichloroethane is a very useful and highly versatile industrial solvent. It is likewise well known that 1,1,1-trichloroethane is the most readily degradable of the chlorinated hydrocarbons when in contact with aluminum and that such degradation occurs whether the solvent is hot or cold and whether the metal contact occurs in the vapor or liquid phases. It is further a well-established fact that 1,1,1-trichloroethane stabilized with certain materials to prevent aluminum-induced degradation is more readily susceptible to degradation in the presence of zinc and other metals. In order for the art to enjoy the benefits of this highly useful and versatile solvent, there is a continuing need to find substances which will stabilize 1,1,1-trichloroethane in the presence of aluminum, zinc, iron, copper and their alloys alone and when these metals are present in any combination.

It is therefore an object of this invention to provide a stabilized 1,1,1-trichloroethane composition. A further object of this invention is to provide a method whereby 1,1,1-trichloroethane can be prevented from deteriorating in the presence of aluminum, iron, zinc, copper, their alloys, singly or in combination. These and other objects and advantages of the present invention will become apparent on the reading of the following detailed specification.

The compositions of this invention are excellent solvents useful as carrier vehicles for other organic materials and as liquid solvents to remove oil, grease and the like from metal parts. Such solvent compositions may be used hot or cold in the presence of substantially any metal without any substantial amount of metal-induced solvent decomposition occurring.

After use as a carrier vehicle or oil and grease solvent, the stabilized 1,1,1-trichloroethane composition of this invention is easily recovered by distillation. Due to its boiling point, the inhibitor is recovered simultaneously with the 1,1,1-trichloroethane and the stabilized solvent is therefore usually available for reuse with little or no additional stabilizer needed.

BRIEF DESCRIPTION OF THE DISCLOSURE

The present invention comprises maintaining in intimate association with 1,1,1-trichloroethane at least about 2% by volume of methoxyacetonitrile in combination with at least 0.25 to about 2% by volume each of nitromethane, propargyl alcohol, butylene oxide, or mixtures thereof. The principal stabilizer, methoxyacetonitrile has the utility to stabilize 1,1,1-trichloroethane if it is to be employed in the liquid state and in the presence of only aluminum or iron or their alloys, such as 1010 steel or 24S aluminum for short periods of time. Methoxyacetonitrile stabilized 1,1,1-trichloroethane will generally not prevent the aluminum-1,1,1-trichloroethane reaction for periods in excess of 72 hours at or near the boiling point of the solvent. When one or more of the above-named additional materials is added to the composition and maintained within the range set forth, the 1,1,1-trichloroethane can be generally employed in either the liquid or vapor state for degreasing metals of aluminum, iron and steel and brass. However, when zinc metal is employed, unless the butylene oxide is also included in the stabilizer compositions, the zinc strips will be stained and the solvent become colored to a light straw color after periods exceeding 7 days under reflux conditions. Therefore, when all of the metals of the type mentioned above, iron and steel, aluminum, including its alloys, as well as brass and copper and their alloys are to be in contact with the 1,1,1-trichloroethane, the stabilizer composition of the present invention must include, in addition to the principal stabilizer, methoxyacetonitrile, nitromethane or propargyl alcohol and butylene oxide. A preferred composition for use in degreasing all of the metals above named is one which contains from about 2 to 4% by volume methoxyacetonitrile, from 0.25 to 1% by volume of either nitromethane or propargyl alcohol and from about 0.25 to 1% by volume of butylene oxide.

DETAILED DESCRIPTION OF INVENTION

The following examples are provided to further illustrate the invention but are not to be construed as limiting.

Example 1

Uninhibited 1,1,1-trichloroethane, obtained from a final finishing still was obtained in glass containers directly from the manufacturer. To 65 ml. samples of this uninhibited 1,1,1-trichloroethane, placed in flasks, preferably Erlenmyer flasks, was added various inhibitors. Each flask was fitted with a water-cooled condenser. Strips of 1010 steel, 24S aluminum, No. 11 aluminum, zinc and 70/30 brass, 2½ inches long and ½ inch wide, were placed into the flask in such a position that about ½ of each strip was below the surface of the test formulation and the other half extended into the zone above the liquid. When the assembly had been completed and the test formulation introduced into the Erlenmyer flask, each flask was placed upon a hot plate. The hot plate was adjusted to provide sufficient heat to maintain the test formulation boiling. Heating was commenced and observations were made in the morning and in the evening of each day. The heating was continued on a 24-hour basis until a flask went dry or there was observed a material change in the nature of the metal strips or color of the liquid in the flask. The following data listed in tabular form is a summation of the results obtained employing various amounts of the principal inhibitor, methoxyacetonitrile, and minor amounts of the other inhibitors, nitromethane, propargyl alcohol and butylene oxide. For comparative purposes, data obtained employing each inhibitor, alone as well as combinations of each of the secondary inhibitors with each other is set forth.

| Methoxy acetonitrile | Nitromethane | Propargyl alcohol | Butylene oxide | Length of test, hrs. | Remarks |
| --- | --- | --- | --- | --- | --- |
| 2.0 | 0.25 | | 0.25 | 168 | Solvent slightly off-color; Zn and Brass each have few pin-point spots; Al and Fe bright; no deterioration of solvent or strips. |
| 4.0 | 0.25 | | 0.25 | 168 | Solvent slightly off-color; all metal strips bright; no deterioration of solvent or strips. |
| 4.0 | | 1.0 | 0.25 | 168 | Do. |
| 4.0 | | 0.25 | 1.0 | 168 | No deterioration of solvent or strips. |

The following series of tests were run for comparative purposes

| Methoxy acetonitrile | Nitromethane | Propargyl alcohol | Butylene oxide | Length of test, hrs. | Remarks |
| --- | --- | --- | --- | --- | --- |
| 4.0 | | | | 72 | Aluminum strip completely disappeared in 72 hours. Solvent black-aluminum reaction started in vapors and carried into solvent liquid. Other strips appeared spotted and heavily stained. |
| 4.0 | 1.0 | | | 24 | Do. |
| 4.0 | | 0.5 | | 168 | Zinc black, solvent black—all strips stained. |
| 4.0 | | | 0.3 | 24 | Aluminum completely disappeared; solvent black; all strips stained. |
| | 0.5 | | | 0 | Immediate reaction with aluminum in cold solvent. |
| | | 0.5 | | 0 | Aluminum reacted before reflux temperature attained. |
| | | | 0.5 | 0 | Do. |
| | 0.5 | | 0.5 | 24 | Aluminum reacted within 24 hours; solvent black. |
| | | 0.5 | 0.5 | 24 | Do. |

It is thus apparent that no single material is capable of inhibiting all of the metal 1,1,1-trichloroethane reactions when the metals are exposed to the vapors of the solvent. The combination of the present invention is shown to be effective when at least 2% by volume of the principal inhibitor methoxyacetonitrile is employed in combination with at least 0.25% by volume of a lower alkylene oxide such as epichlorohydrin, propylene oxide, butylene oxide, and pentylene oxide, and at least one of 0.25% by volume of nitromethane or propargyl alcohol. While it is to be understood that more than the above minimum amounts can be employed, about 4% by volume of the principal inhibitor, methoxyacetonitrile, and 0.5% butylene oxide and 0.5% nitromethane or 0.5% propargyl alcohol are preferred.

The solvent formulations of the present invention are useful for degreasing the metals aluminum, zinc, copper, iron and their alloys in conventional commercial degreasing processes, including cold, hot and vapor processes. Further, the solvent formulations of the present invention are useful as a carrier for solvent soluble, dispersible or emulsifiable organic materials commonly employed in such diverse fields as textile treating with water, oil and stain repellents, in the cosmetic industry or pressurized systems such as in grooming aids such as hair sprays, shaving creams and lotions, as well as gardening and agricultural aerosol sprays.

I claim:
1. 1,1,1-trichloroethane consisting essentially of from about 2.0% to about 4% by volume methoxyacetonitrile and from about 0.25% to about 1% by volume of a lower alkylene oxide having from 3 to 5 carbon atoms which may also contain a chlorine atom and at least one member selected from the group consisting of:
   (a) 0.25% to about 1% by volume of propargyl alcohol, and
   (b) 0.25% to about 1% by volume of nitromethane.
2. 1,1,1-trichloroethane consisting essentially of from about 2% to about 4% by volume of methoxyacetonitrile, from about 0.25 to about 1% by volume of butylene oxide and from about 0.25 to about 1% by volume of nitromethane.
3. 1,1,1-trichloroethane consisting essentially of from about 2% to about 4% by volume of methoxyacetonitrile, from about 0.25 to about 1% by volume of butylene oxide and from about 0.25 to about 1% by volume of propargyl alcohol.
4. In a method for degreasing the metals aluminum, iron, zinc, copper or their alloys which comprises introducing the metal to be degreased into the liquid or vapor of 1,1,1-trichloroethane, the improvement which consists in maintaining in intimate admixture with said 1,1,1-trichloroethane from about 2.0% to about 4% by volume methoxyacetonitrile and from about 0.25% to about 1% by volume of a lower alkylene oxide having from 3 to 5 carbon atoms which may also contain a chlorine atom and at least one member selected from the group consisting of:
   (a) 0.25% to about 1% by volume of propargyl alcohol, and
   (b) 0.25% to about 1% by volume of nitromethane.

References Cited

UNITED STATES PATENTS

| 2,737,532 | 3/1956 | Strain et al. | 260—652.5 |
| 3,120,567 | 2/1964 | Dial | 260—652.5 |
| 3,326,988 | 6/1967 | Stack | 252—171 |

LEON D. ROSDOL, Primary Examiner

W. E. SCHULZ, Assistant Examiner

U.S. Cl. X.R.

252—364, 399; 260—652.5